Figure 1:
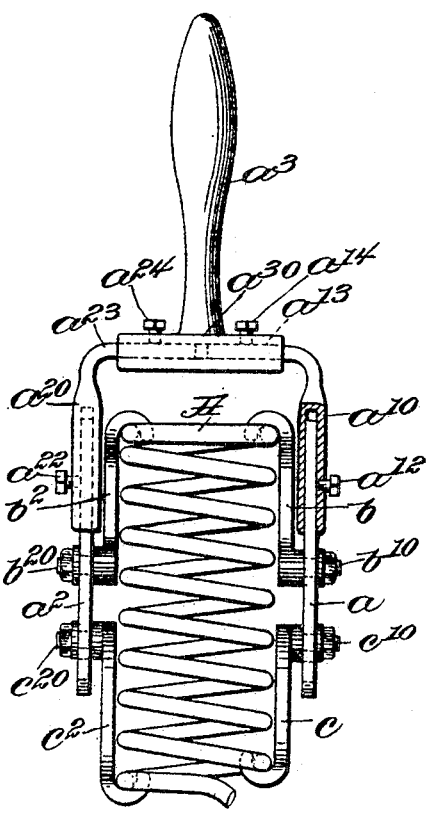

No. 798,917. PATENTED SEPT. 5, 1905.
J. W. McDONALD.
SPRING COMPRESSING DEVICE.
APPLICATION FILED FEB. 6, 1905.

Witnesses:
Jas. F. Maloney.
Margaret F. Rooney.

Inventor:
John W. McDonald,
by J. R. and A. F. Livermore,
Attys.

UNITED STATES PATENT OFFICE.

JOHN W. McDONALD, OF BOSTON, MASSACHUSETTS.

SPRING-COMPRESSING DEVICE.

No. 798,917.　　　　Specification of Letters Patent.　　　　Patented Sept. 5, 1905.

Application filed February 6, 1905. Serial No. 244,399.

*To all whom it may concern:*

Be it known that I, JOHN W. McDONALD, a citizen of the United States, residing in Boston, county of Suffolk, and State of Massachusetts, have invented an Improvement in Spring-Compressing Devices, of which the following description, in connection with the accompanying drawings, is a specification, like letters on the drawings representing like parts.

The present invention relates to a spring-compressing device, and is embodied in an implement adapted for compressing springs, such as spiral springs, and holding the same compressed until they can be placed in the position in which they are to be used.

The purpose of the invention is to obtain a small but powerful implement which can be operated by hand and used for compressing a spring, such as a stiff spiral spring, where a vise or similar implement is not accessible. Taking, for example, the case of a gasolene-engine used in an automobile, in which very heavy spiral springs are used under high tension to operate the exhaust-valves, it is a matter of extreme difficulty to replace a broken spring on the road without some special means for compressing the spring before placing it in a position to be pinned between the valve-stem and the abutment against which it reacts.

The implement embodying the invention is especially adapted for use as an emergency-tool for the purpose above described in connection with automobiles; but it is obvious that it is capable of use in any case where a spring is to be compressed and maintained in a compressed condition for any reason.

The invention is herein shown as embodied in a device especially adapted for compressing spiral springs, and when designed for this particular purpose consists in a yoke of sufficient width to straddle the spring, the said yoke being provided with two pivoted links on each member, the pivotal supports of said links being some distance apart, so that if a spiral spring is engaged at its opposite ends by said links and then turned end for end with relation to the yoke the ends of the links will be drawn together a distance equal to twice the distance between the pivotal supports, thereby compressing the spring engaged by the links. It is obvious that an implement having the same characteristics may be used in connection with other kinds of springs, it being necessary only to provide the supporting member with at least two pivoted members or links to engage those parts of the spring which are to be drawn together, so that the reversing of the spring with relation to the supporting member will compress the spring.

In the construction shown the supporting member is provided with adjustments whereby it may be adapted for springs of different sizes, while the actuating portion of the supporting member is detachable, so that after the spring is in place the said member may be removed before the spring is released, so that the remainder of the device will take up less room in case the spring is to be applied in a place which is not easily accessible.

Figure 2:
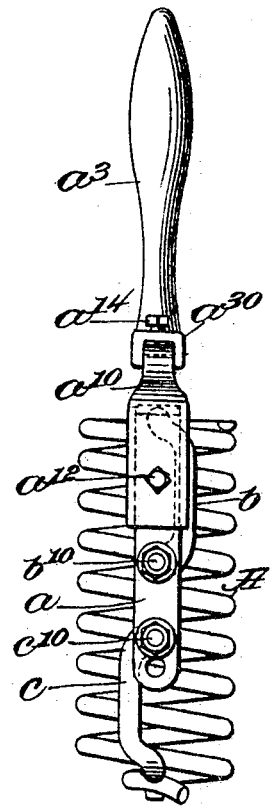

Figure 1 is a side elevation of a device embodying the invention, with a spiral spring therein, the parts being shown as in their normal position. Fig. 2 is a similar side elevation taken on a plane at a right angle to that of Fig. 1, and Fig. 3 is a view of the implement after it has been moved to a position to compress the spring and with the actuating member removed.

In the construction chosen to illustrate the invention the supporting member of the implement consists of the arms $a$ $a^2$, which are supported in a position parallel to each other, being shown as removably secured in the members $a^{10}$ $a^{20}$ of a yoke provided with an actuating-handle $a^3$. As herein shown, the members $a$ $a^2$ are telescoped in sockets formed in the yoke members $a^{10}$ $a^{20}$ and secured therein by means of set-screws $a^{12}$ $a^{22}$. Secured to the members $a$ and $a^2$ are the links $b$ $b^2$ and $c$ $c^2$, the said links being all independent of each other and pivotally supported, as shown at $b^{10}$ $b^{20}$ $c^{10}$ $c^{20}$. As clearly shown in Fig. 1, the several links when the implement is especially adapted for use with spiral springs are provided at their ends with hooked portions which are arranged to engage the end coils of the spring A, the links being of such length as to embrace the spring when in substantially its normal relaxed condition. After the spring has been placed in engagement with the links it is obvious that if the said spring is simply turned end for end with relation to the members $a$ $a^2$ the position of the pivotal supports of the two pairs of links will be reversed, as indicated in Fig. 3, so that the ends of the links will be drawn together to a distance equal to twice the distance between the said pivotal supports, so that the spring held between the links will be compressed a distance equal to the distance aforesaid.

Figure 3:
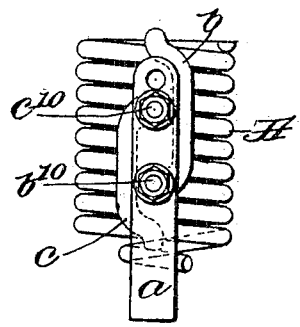

As shown in Figs. 2 and 3, the links $b\ b^2$ and $c\ c^2$ are grooved or offset, so that the pivotal support of one link will not interfere with the body of the other link, whereby the spring may be completely turned around and left compressed with the links in a dead-center position, so that there is no tendency for the spring to release itself.

In order to obtain an efficient leverage, the implement may be provided with the actuating-handle $a^3$, heretofore mentioned, it being further practicable to secure the yoke members $a^{10}$ and $a^{20}$ to said actuating member through the agency of a socket $a^{30}$, formed in said member, in which the offset portions $a^{13}$ and $a^{23}$ of said members may be secured by set-screws $a^{14}$ and $a^{24}$. This construction renders the implement adjustable to accommodate springs of different diameters.

It will be seen that the spring may be readily placed in engagement with the links and that when so arranged it may be easily taken hold of with one hand and turned with relation to the link-supporting yoke, the actuating member of which may be held in the other hand, and a powerful leverage being thereby attained. The spring once compressed, as shown in Fig. 3, will be securely held by the implement and may be placed in any position desired—around the valve-stem, for example—and released after the ordinary locking or retaining means have been placed in position by merely moving the yoke portion laterally until the pivotal supports of the links are out of alinement. If the spring is to be applied in position where it would be impracticable to remove the implement after the spring was in place, it is perfectly feasible to wind a few turns of wire or cord around the coils of the springs to hold the same compressed after the implement has been removed, and after the spring has been placed in its proper position the wire or cord can be cut and taken off.

What I claim is—

1. A compressing device for springs comprising a supporting member and links pivotally connected to said supporting member at some distance apart, said links being provided with engaging portions to engage the portions of the spring which are to be drawn together in compressing the same, whereby the end-for-end reversal of the spring with relation to the support will result in the compression of the spring.

2. In a device for compressing a spring, the combination with a yoke; of a pair of corresponding links pivotally secured respectively at different points to the two arms of the yoke; and engaging portions forming part of said links to engage the opposite ends of a spiral spring, whereby the end-for-end reversal of said spring with relation to the yoke will result in the compression of the spring, substantially as described.

3. In an implement for compressing spiral springs, the combination with two supporting members; of a supporting-yoke, to the members of which the said supporting members are detachably secured; means for laterally adjusting said yoke members to vary the width of the yoke; and a pair of links secured to each supporting member, said links having hooked-shaped engaging portions to engage the coils of a spiral spring, substantially as described.

In testimony whereof I have signed my name to this specification in the presence of two subscribing witnesses.

JOHN W. McDONALD.

Witnesses:
MARGARET E. COVENEY,
HENRY J. LIVERMORE.